Oct. 30, 1934.  I. Q. GURNEE  1,978,532
HARD RUBBER HANDLE FOR KNIVES, FORKS, OR LIKE
ARTICLES AND METHOD OF MAKING THE SAME
Filed Oct. 21, 1929

Inventor
ISAAC Q. GURNEE.
By Parker Cook
Attorney

Patented Oct. 30, 1934

1,978,532

UNITED STATES PATENT OFFICE 1,978,532

HARD RUBBER HANDLE FOR KNIVES, FORKS, OR LIKE ARTICLES AND METHOD OF MAKING THE SAME

Isaac Q. Gurnee, Butler, N. J.

Application October 21, 1929, Serial No. 401,196

1 Claim. (Cl. 30—9)

My invention relates to new and useful improvements in hard rubber handles for knives and forks and the method of making the same, and has for an object to produce a handle that may be easily and readily attached to the hilt of a knife, fork, spoon or other similar article and after once so attached will not loosen or become detached therefrom.

Still another object of the invention is to produce a hard rubber handle having a core of special design in which there will be mated the hilt of a fork or knife.

Still another object of the invention is to provide a hard rubber handle having a core hole provided with bulges or recesses therein, the molding of which, however, will not distort the outer surface of the handle, as so often happens to handles made under the present method.

In an application filed by me on September 28, 1929, Serial No. 395,841, I have shown a mold for manufacturing these handles in large quantities, but in that application I simply showed a tapering insert or core to form the core hole, whereas in the present application, the insert is designed to form the core hole of novel design, so that after the hilt of the knife or fork has been placed therein and the handle shrunk on, it will be impossible for the parts to become detached.

The present method of making hard rubber handles is to semi-cure the same with a core therein and after the handles are received by the knife or fork manufacturer, the hilt of the metal fork or knife is fish-hooked, that is, sharp kerfs or nitches are cut therein with a chisel or sharp pointed instrument and the handles are then heated and the hilts driven within the hollow shank of the handle and allowed to cool, but these multiplicity of kerfs or cuts or nitches distort the hard rubber walls and make the outer surface of the handle rough. In other words, putting the handle over a fish-hook hilt causes a distortion continuing to the outer surface and the handles are then finally smoothed on a belt and at a relatively large expense.

Another object of the present invention, therefore, is to so form the hard rubber handle that the outer surface of the handle will not be distorted as by the previous methods and, in fact, it is only necessary to put the handles in the tumbling barrel and let them revolve for a short period to thereby smooth the outer surface of the handles and remove any slight overshots or fins or any other slight roughness of the handle.

With these and other objects in view, the invention consists in certain new and novel arrangements, and combination of parts, as will be hereinafter more fully described and pointed out in the claims.

Referring now to the drawing showing a preferred embodiment of my invention,

Figure 1:
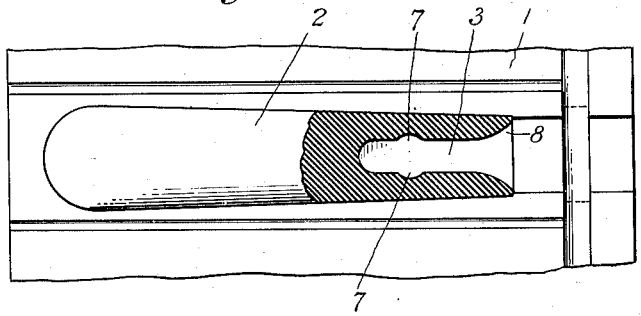
Fig. 1 is a fragmentary portion of a mold with the handle therein, part of the handle being broken away to show the outline of the core hole.
Figure 3:
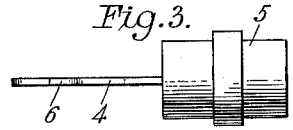
Fig. 3 is a side elevation of the same.

Referring now more particularly to the several views, there is shown in Fig. 1 a fragmentary portion of a mold similar to the mold shown in my application, filed September 28, 1929, bearing Serial No. 395,841, and in which may be seen the hard rubber handle 2 in the making, in which is cored the hole 3. It will be understood that this is spoken of as a core hole, but in reality this core hole is flat, as it is formed by the flat projection 4 of the insert, core or mandrel 5. In Fig. 3, an edge view of this projection 4 is shown and the core hole 3 will, of course, be of the same thickness.

It will be noticed that on this projection 4, there are the slight diametrically opposite bulges 6 formed in the metal, so that corresponding indentations or slight recesses 7 will be formed on the side walls of the core hole 3. The outer end of the core hole 3 increases in width, as at 8.

Figure 5:
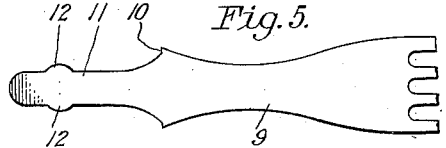
Fig. 5 is a fragmentary view of a fork showing the hilt with a male portion or bulge adapted to fit within the recess of the core hole of the handle.

Referring now for the moment to Fig. 5, there is a fragmentary portion of a fork 9 shown with the shoulder 10 and with the metal hilt 11 that will have formed thereon slight projections 12 which, when this hilt is placed within the core hole 3, will register, that is, the projections 12 will register and fit within the indentations 7 formed in the cored handle.

This fork 9 may be stamped from a single sheet of metal and the hilt will be made to correspond with the form of core hole in that handle, that is, one will mate within the other. It will be understood that instead of a fork 9, a knife blade might be substituted just so the hilt is similar to the hilt 11.

Figure 2:
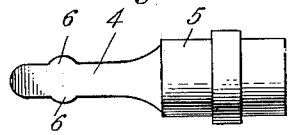
Fig. 2 is a view of the metal core or insert to show how the core hole is formed in the handle.
Figure 6:
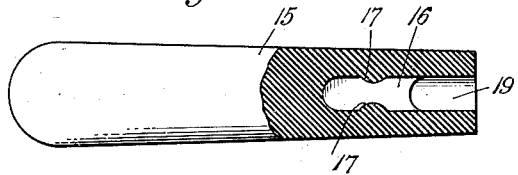
Fig. 6 is a view of a handle partly in section and showing the core hole being circular at its outer end rather than flat and also showing a bulge in the core hole rather than a depression.

Before describing the form shown in Fig. 6, mention will be made of how the metal fork or metal knife is secured to the handle. The desired rubber composition is placed within the mold and semi-cured in the ordinary manner of manufacturing hard rubber. Of course, the cored insert, as shown in Fig. 2, is placed within the mold so that as the rubber is semi-cured, the core hole or recess will appear centrally thereof. After the rubber has been semi-cured, the top (not shown) of the mold will be removed and likewise the insert or core 5 will also be removed. After the insert has been removed, the handle is cured and vulcanized in the ordinary way of molding hard rubber goods.

It is possible to remove the core or insert when the rubber is still warm and in its semi-cured condition, and the withdrawing of the core will not distort the core hole. After the handles have been cured or vulcanized in the regular manner, they may then be placed within a tumbling barrel and thus finished at a relatively small expense. This tumbling barrel will take off any fins caused by overshots and will provide a nice smooth surface for the handle, and by forming the core hole as shown the indentations or recesses formed in the core will not force or distort the rubber of the handle on the outside surface.

After these handles are thus finished in the tumbling barrel, they will be shipped to the knife or fork manufacturer where they will be again heated to soften the same and the hilt of the knife or fork may be jammed up within place, so that the enlarged portion 12 of the hilt will nicely fit or mate within the indentation 7 of the core hole 3 and the hilt 11, of course, will lie snugly throughout within its flat core hole 3, the shoulder 10 of the hilt abutting the outer edge of the knife handle. The hard rubber handle is then allowed to cool and shrink and will so tightly grip the hilt of the knife or fork that it will be impossible for the parts to ever become loosened or to become disengaged unless the handle or blade or metal fork portion is destroyed.

As heretofore mentioned, the usual practice is to form a tapered hole or core hole in the handle and to then "fish-hook" or indent the hilt and shrink on the handle, but this fish-hooking causes the rubber about the core hole, when soft, to distort to such an extent that it roughens or bulges the outer surface of the handle and makes it necessary to smooth the handles with a belt, which is a manual operation and an expensive one.

With the applicant's handle and method, however, the little depression formed in the core hole will not bulge out the rubber walls and distort the outer surface and, therefore, this smoothing with a belt is done away with and the handles, as has also been mentioned, may simply be placed in a tumbling barrel.

Figure 7:
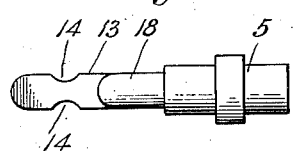
Fig. 7 is a fragmentary view of the core forming this core hole in the handle.

Referring now for the moment to Fig. 7, it will be seen that in this instance, the core or insert 5 has the flat projection 13 and, in this instance, instead of having little bulges 12 on its side, it has little depressions 14 formed therein, so that when the handle 15 is formed, the core hole 16 will have the little bulges 17 formed on the side walls.

Figure 4:
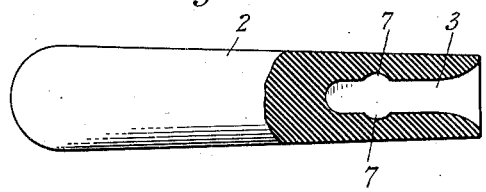
Fig. 4 is a view of a knife or fork handle partly in section showing the handle removed from the mold.

Also, in this form, I have shown the projection 13 as being rounded, as at 18, so that the core hole 16 near its outer end will be round, as at 19, rather than flat. Of course, if desired, this round portion may be left off and the core hole may be flat throughout its length and still have the little projection 17 formed in the core hole. In other words, if the rubber handle has depressions 7, as in Fig. 4, the metal part of the knife or fork will have the bulges 12, whereas if the rubber handle has the bulges 17 in the core hole, the metal part will have depressions 14 similar to that shown on the core in Fig. 7.

Figure 8:
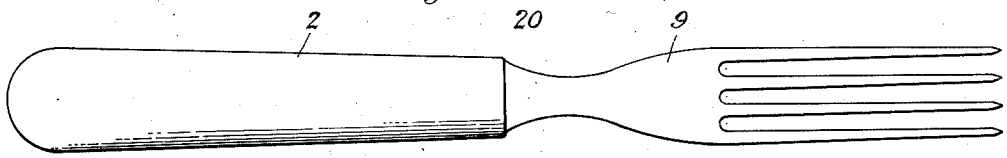
Fig. 8 is an assembled view of the handle and fork.

In Fig. 8, I have shown the completed fork 20 with the rubber handle shrunk tightly on the hilt of the fork.

Figure 9:
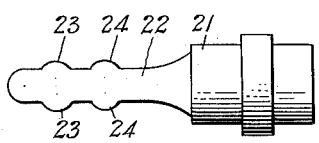
Fig. 9 is a fragmentary view of a core with a double bulge on the core to thus form a double bulge in the core hole of the handle.

In Fig. 9, there is shown a still further slightly modified form and in this instance the core 21 is shown with a hilt 22 with the two little bulges 23 and 24 formed diametrically opposite each other, so that the knife handle would have two depressions in the core hole similar to the depression 7 rather than one depression, and it will be understood without further illustration that instead of having two bulges 23 and 24 on the core, these might be made indentations and to form two bulges diametrically opposite each other similar to the bulges 17 in the core of the handle.

In other words, in making this core hole, which is preferably flat, I may either have slight depressions or slight bulges, and the knife handle or fork handle will have oppositely formed depressions or bulges to mate therewith.

From the foregoing, it will be seen that I have provided a handle and a hilt which cooperate with each other and which, when once mated and the handle shrunk in position, will not ever loosen or become separated one from the other.

Furthermore, handles formed in this manner do not call for any skilled labor, such as using a belt to smooth them, but may simply be thrown into a tumbling barrel before being heated for the last time and shrunk on the hilt of the knife or fork.

The withdrawing of the cores after the handles have been semi-cured in no way distorts the cores and likewise the forming of these mating parts does not distort the outside of the handle, as is often the case when the hilt of the instrument is fish-hooked within the handle.

Many slight changes might be made without departing from the spirit and scope of the invention.

Having thus described my invention, what I claim as new and desire to secure by Letters Patent is:—

A molded hard rubber handle for knives, forks, and the like having a non-tapering flat passageway formed in the one end of the handle, said passageway being greatly flared at its mouth and restricted throughout its length, the side walls of the flat passageway provided with several broken surfaces and the remainder of the said passageway being smooth throughout its length, the said passageway adapted to tightly fit throughout its length and interlock with a correspondingly formed flat hilt whose broken surfaces register with the broken surfaces in the flat side of the restricted passageway of the handle and the walls at the flared surface of the passageway and the rear end of said passageway acting as abutments as well as partly encircling gripping means for the article inserted within said rubber handle.

ISAAC Q. GURNEE.